US012810399B2

(12) United States Patent
Grilikhes

(10) Patent No.: US 12,810,399 B2
(45) Date of Patent: Nov. 24, 2026

(54) GLOBAL TONE MAPPING OF IMAGES BASED ON LUMINANCE AND CHROMINANCE

(71) Applicant: Intel Corporation, Santa Clara, CA (US)

(72) Inventor: Dmitry Grilikhes, Rehovot (IL)

(73) Assignee: Intel Corporation, Santa Clara, CA (US)

(*) Notice: Subject to any disclaimer, the term of this patent is extended or adjusted under 35 U.S.C. 154(b) by 48 days.

(21) Appl. No.: 17/957,080

(22) Filed: Sep. 30, 2022

(65) Prior Publication Data

US 2023/0021602 A1 Jan. 26, 2023

(51) Int. Cl.
*G06T 5/92* (2024.01)
*G06T 7/90* (2017.01)
*H04N 9/64* (2023.01)

(52) U.S. Cl.
CPC .................. *G06T 5/92* (2024.01); *G06T 7/90* (2017.01); *H04N 9/646* (2013.01); *G06T 2207/10024* (2013.01); *G06T 2207/20208* (2013.01); *H04N 9/643* (2013.01)

(58) Field of Classification Search
CPC . G06T 2207/20208; G06T 2207/10024; G06T 7/90; G06T 5/92; G06T 5/90; G06T 5/94; G06V 10/60; G06V 10/56; H04N 9/646; H04N 9/643; H04N 9/77; H04N 23/86
See application file for complete search history.

(56) References Cited

U.S. PATENT DOCUMENTS

| | | | | |
|---|---|---|---|---|
| 9,386,288 B2 * | 7/2016 | Akeley | ................ | H04N 23/843 |
| 2008/0043262 A1 * | 2/2008 | Ovsiannikov | ........ | H04N 1/4072 358/1.9 |
| 2012/0076404 A1 * | 3/2012 | Bryant | ...................... | G06T 5/92 382/167 |

OTHER PUBLICATIONS

Mantiuk, R., Mantiuk, R., Tomaszewska, A. and Heidrich, W. (2009), Color correction for tone mapping. Computer Graphics Forum, 28: 193-202. https://doi.org/10.1111/j.1467-8659.2009.01358.x (Year: 2009).*

(Continued)

*Primary Examiner* — Andrew W Bee
*Assistant Examiner* — Emma E Dryden
(74) *Attorney, Agent, or Firm* — Hanley, Flight & Zimmerman, LLC

(57) ABSTRACT

Example methods, apparatus, systems and articles of manufacture (e.g., physical storage media) to implement global tone mapping of images based on luminance and chrominance are disclosed. Examples disclosed herein determine a chromatic gain to apply to input chrominance components corresponding to an input color of a pixel of the input image, the chromatic gain based on an input luminance component corresponding to the input color of the pixel and a luminance gain to be applied to the input luminance component of the pixel to determine an output luminance component of the pixel. Disclosed examples also apply the chromatic gain to the input chrominance components of the pixel to determine output chrominance components of the pixel. Disclosed examples further combine the output luminance component and the output chrominance components to determine an output color of the pixel.

18 Claims, 12 Drawing Sheets

(56) References Cited

OTHER PUBLICATIONS

Wikipedia, "Tone Mapping," last edited Jan. 3, 2023, retrieved on Apr. 3, 2023 from <https://en.wikipedia.org/wiki/Tone_mapping>, 7 pages.
Fattal, et al., "Gradient Domain High Dynamic Range Compression," Jul. 2002 ACM Transactions on Graphics 21 (3), 8 pages.
Yang, et al., "Tone Mapping Based on Multi-scale Histogram Synthesis," arXiv:2102.00408v1, Jan. 31, 2021, 10 pages.
GIMP, "GNU Image Manipulation Program," no date, retrieved on Apr. 28, 2023 from <https://www.gimp.org/>, 7 pages.

* cited by examiner

GLOBAL TONE MAPPING OF IMAGES BASED ON LUMINANCE AND CHROMINANCE

FIELD OF THE DISCLOSURE

This disclosure relates generally to image processing and, more particularly, to global tone mapping of images based on luminance and chrominance.

BACKGROUND

Modern digital imaging devices, such as digital cameras, smartphones, etc., process captured input images, such as high dynamic range (HDR) images, with a tone mapping feature implemented in hardware (e.g., via circuitry) and/or software (e.g., via an application executed by a processor). For example, a digital imaging device may implement a tone mapping feature to enhance details and/or colors in the dark parts of the dynamic range of an input image to generate an output image that appears more natural than the original input image. In some examples, tone mapping involves multiplying the luminance, or brightness, component of a pixel of the input image by a gain that is calculated from the pixel's luminance component.

BRIEF DESCRIPTION OF THE DRAWINGS

In general, the same reference numbers will be used throughout the drawing(s) and accompanying written description to refer to the same or like parts. The figures are not to scale.

Figure 1:
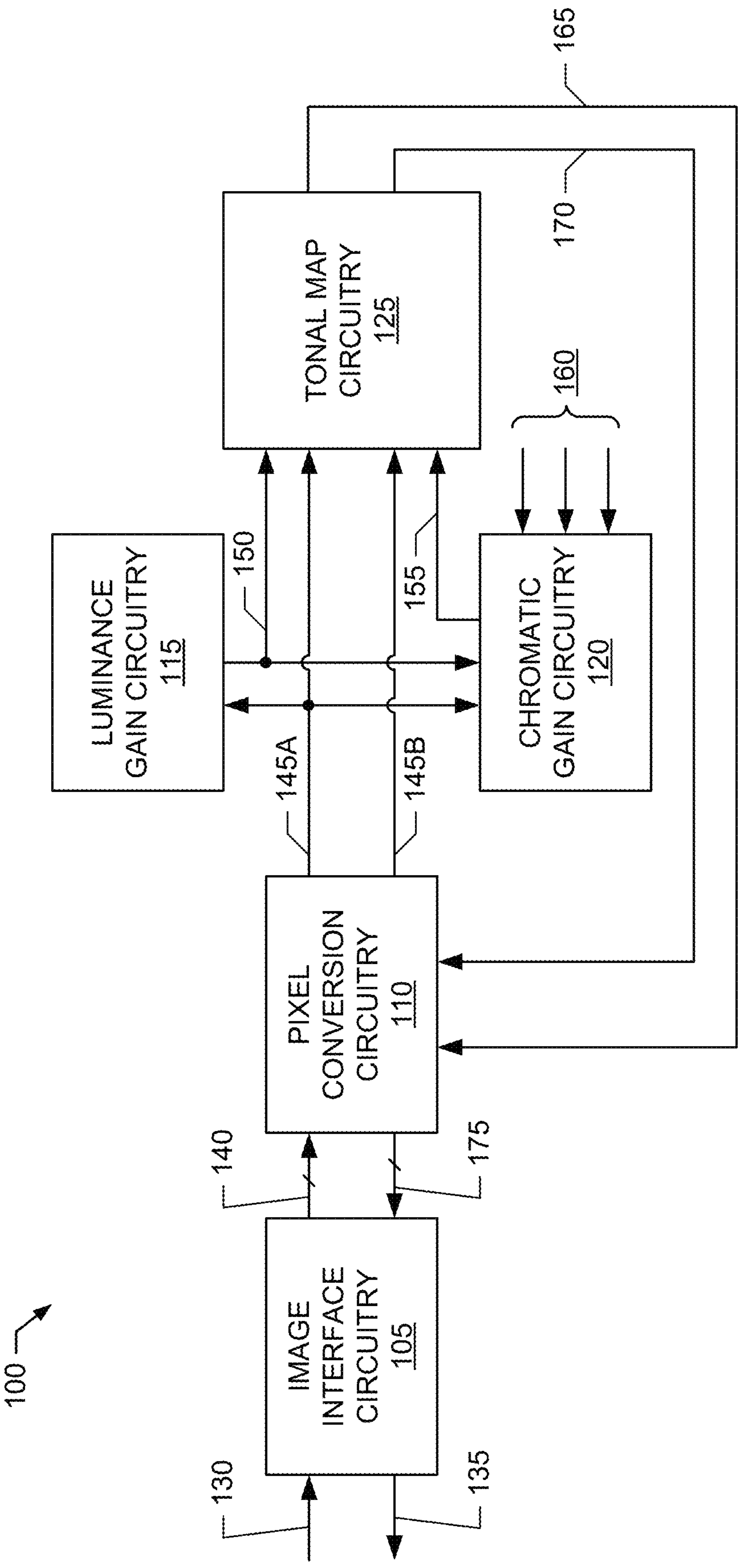
FIG. 1 is a block diagram of example global tone mapping circuitry to implement global tone mapping of images based on luminance and chrominance in accordance with teachings of this disclosure.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Example methods, apparatus, systems and articles of manufacture (e.g., physical storage media) to implement global tone mapping of images based on luminance and chrominance are disclosed herein. As noted above, a digital imaging device may implement a tone mapping feature to enhance details and/or colors in the dark parts of the dynamic range of an input image to generate an output image that appears more natural than the original input image. In some examples, tone mapping involves multiplying the luminance, or brightness, component of a pixel of the input image by a gain that is calculated from the pixel's luminance component. Therefore, a goal of global tone mapping is to determine three output color coordinates (e.g., R, G and B for RGB images) for a pixel based on a calculated luminance, or brightness, gain and the input color value itself. Despite the relative simplicity of the problem's definition, the technical solution is not trivial and, in fact, can be complex. For example, there is no universal formula to predict an output color of an object if the illumination of the object is increased by a gain factor. This problem is underdefined because the physical model of a real color is much more complicated than the RGB color representation employed by typical image color processing applications. However, as digital imaging devices rely on such an RGB color representation, the inputs of a global tone mapping feature implemented by such devices may be limited to the three RGB color coordinates, also referred to as the RGB color channels, of the input pixels and the luminance, or brightness, gain calculated for each pixel. Such a global tone mapping feature should, without any additional data other than some customer tuning parameters, calculate the final values of each color coordinate in the output pixels to make the output image look natural both in terms of the brightness and contrast, and in the terms of chromaticity. This is especially complex in the common HDR to standard dynamic range (SDR) conversion cases, where the calculated luminance gains tend to be relatively high.

Prior image processing chains may contain a global tone mapping (GTM) application that implements one of two known algorithms. The first algorithm employed by some prior GTM applications uses a single common gain value, calculated based on a heuristic method, as a common multiplier for all color channels of a pixel. In this first algorithm, the image may become oversaturated and need correction with an additional procedure. In some examples of the first algorithm, a common approach is to use a gain value, which is calculated for the highest color channel of the input pixel, across all channels. This approach avoids color channel clipping but in the HDR case, when the gains are high, can produce an output image with many artifacts of damaged brightness ratio between chromatically saturated and grey colors. A second algorithm employed by some prior GTM applications involves conversion to the YUV color space and application of gain to only the Y, or luminance, coordinate. In this second algorithm, the color saturation of the entire image can become unnaturally low, and some additional correction procedure may need to be applied before converting the pixel back to the RGB color space.

In contrast with such prior GTM techniques, example solutions for global tone mapping based on luminance and chrominance disclosed herein calculate the output color coordinates of tone mapped pixels by separating a pixel's color vector into luminance (or brightness) and chrominance components in RGB space, and then applying two gains to those components, with one of the gains being applied to the luminance component and the other gain being application to the chrominance components. In some disclosed examples, the luminance, or brightness, gain, $g_l$, for a pixel is calculated using any appropriate technique, such as one of the prior algorithms described above, and is applied to the luminance, or brightness, component of the pixel without further modification. However, in some disclosed example solutions, a chromatic gain, $g_{ch}$, for the pixel, which is to be applied to the chrominance, or chromatic, components of that pixel, is calculated separately as a function of the luminance/brightness gain and the input pixel brightness according to Equation 1, which is:

$$g_{ch} = \frac{(g_l + c) * (1 + b - g_l * l)^a}{(1 + c) * (1 + b - l)^a} \quad \text{Equation 1}$$

In Equation 1, $g_l$ is the luminance/brightness gain, l is the luminance, or brightness, of the input pixel, and the parameters a, b, and c are three configurable parameters used to tune Equation 1.

Disclosed example solutions for global tone mapping based on the luminance gain, $g_l$, and the chromatic gain, $g_{ch}$, are applicable for any RGB color and any gain $g_l$ larger than one. In some examples, when $g_l$ is less than or equal to one, tone mapping reduces to usage of just the luminance gain, $g_l$, for all three RBG channels. Also, example solutions for global tone mapping based on the luminance gain, $g_l$, and the chromatic gain, $g_{ch}$, disclosed herein are tunable via one or more parameters, such as the three parameters a, b, and c in Equation 1. Such tuning supports adaptation of global tone mapping to input and/or output device differences to satisfy user preferences for output image color saturation.

Example solutions for global tone mapping based on luminance and chrominance disclosed herein have several advantages over prior tone mapping techniques. For example, global tone mapping solutions disclosed herein can produce better images in terms of color saturation and brightness-contrast reproduction than prior techniques. Example global tone mapping solutions disclosed herein also allow colors to be of the same hue in the output as they were in the input, thus avoiding hue mistakes. Example global tone mapping solutions disclosed herein also avoid abnormal over-saturation and under-saturation conditions, and perform well for HDR to SDR conversion, where gains may have extremely high values. Example global tone mapping solutions disclosed herein also keep the natural luma-chroma relations, avoiding the damaged brightness ratio between chromatically saturated and grey colors exhibited by prior techniques.

Turning to the figures, FIG. 1 is a block diagram of example global tone mapping circuitry 100 to implement global tone mapping of images based on luminance and chrominance in accordance with teachings of this disclosure. The global tone mapping circuitry 100 of FIG. 1 may be instantiated (e.g., creating an instance of, bring into being for any length of time, materialize, implement, etc.) by processor circuitry such as a central processing unit executing instructions. Additionally or alternatively, the global tone mapping circuitry 100 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 1 may, thus, be instantiated at the same or different times. Some or all of the circuitry may be instantiated, for example, in one or more threads executing concurrently on hardware and/or in series on hardware. Moreover, in some examples, some or all of the circuitry of FIG. 1 may be implemented by microprocessor circuitry executing instructions to implement one or more virtual machines and/or containers.

At a high-level, the example global tone mapping circuitry 100 of FIG. 1 calculates an output color of a pixel based on a luminance/brightness gain calculated for the pixel (e.g., by any appropriate algorithm, as mentioned above) and the input RGB color of that pixel. In the illustrated example, the global tone mapping circuitry 100 converts the color representation of an input pixel from RGB vector components to a combination of luminance and chrominance vector components, as shown in Equation 2, which is:

$$\overrightarrow{RGB_{in}} = \overrightarrow{LumaComponent_{in}} + \overrightarrow{ChromaComponent_{in}} \quad \text{Equation 2}$$

In Equation 2, $\overrightarrow{RGB_{in}}$ is the input RGB color vector of the pixel, $\overrightarrow{LumaComponent_{in}}$ is the corresponding luminance component of that pixel, and $\overrightarrow{ChromaComponent_{in}}$ is the corresponding chrominance component of that pixel. In the illustrated example, the global tone mapping circuitry 100 multiples the luminance component $\overrightarrow{LumaComponent_{in}}$ by the luminance gain ($g_l$) and multiples the chrominance component ($g_{ch}$) by its own separate chromatic gain ($g_{ch}$). The global tone mapping circuitry 100 then computes the output color for the pixel as the vector sum of those two results.

By using separate luminance and chromatic gains $g_l$ and $g_{ch}$ for the luminance and chrominance components, respectively, the global tone mapping circuitry 100 can avoid generating tone mapped output images with hue artifacts and, instead, simulate the normal perception of a colored surface illuminated by light. Note that two different input colors can have the same luminance gain but the global tone mapping circuitry 100 can calculate two different chromatic gains to simulate lighting changes.

As disclosed above and in further detail below, the global tone mapping circuitry 100 of the illustrated example calculates the chromatic gain $g_{ch}$ for a given input pixel when the pixel's brightness gain $g_l$ is greater than one (i.e., $g_l>1$) according to Equation 3, which is:

$$g_{ch} = \frac{(g_l + c) * (1 + b - g_l * l)^a}{(1 + c) * (1 + b - l)^a} \quad \text{Equation 3}$$

In the illustrated example of FIG. 1, when the pixel's luminance gain $g_l$ is less than or equal to one (i.e., $g_l \leq 1$), the global tone mapping circuitry 100 sets the chromatic gain $g_{ch}$ to be the same as the luminance gain $g_l$ (i.e., $g_{ch}=g_l$) and the conversion of the RGB components into luminance and chrominance components is not needed and can be skipped. In Equation 3, $g_l$ is the luminance gain, l is the brightness, or luminance, of the given pixel, and a, b, and c are three configurable parameters that control the shape of the luminance gain to chromatic gain (i.e., $g_l \rightarrow g_{ch}$) transformation given by Equation 3. For example, the configurable parameter a of Equation 3 is an exponent parameter responsible for the degree of the polynomial representing chromaticity reduction, the configurable parameter b of Equation 3 is an offset parameter that allows the chromaticity reduction to be tuned for high gains, and the configurable parameter c of Equation 3 is a scaling parameter that allows chromaticity reduction to be tuned for low gains.

Examining FIG. 1 in further detail, the example global tone mapping circuitry 100 includes example image interface circuitry 105, example pixel conversion circuitry 110, example luminance gain circuitry 115, example chromatic gain circuitry 120 and example tonal map circuitry 125. In the illustrated example of FIG. 1, the image interface circuitry 105 accepts/obtains an example input image 130 that is to undergo global tone mapping in accordance with teachings of this disclosure. The image interface circuitry 105 also outputs an example output image 135 that is the tone mapped version of the input image 130. In some examples, the image interface circuitry 105 is instantiated by processor circuitry executing image interface instructions and/or configured to perform operations such as those represented by the flowchart of FIG. 6.

In the illustrated example of FIG. 1, the pixel conversion circuitry 110 converts the input RGB color values of input pixels 140 of the input image 130 to corresponding luminance and chrominance components 145A and 145B, respectively. For example, for a given input RGB color value ($R_{in}$, $G_{in}$, $B_{in}$) (labeled 140 in FIG. 1), the pixel conversion circuitry 110 computes the corresponding luminance component $LumaComponent_{in}$ of that pixel (labeled 145A in FIG. 1) according to Equation 4, which is:

$$LumaComponent_{in}(\text{< any color coordinae >}) = \frac{1}{3}R_{in} + \frac{1}{3}G_{in} + \frac{1}{3}B_{in} \quad \text{Equation 4}$$

Thus, in some examples, the pixel conversion circuitry 110 computes the luminance component $LumaComponent_{in}$ of an input pixel as the average of the ($R_{in}$, $G_{in}$, $B_{in}$) components of the input RGB color value for that pixel according to Equation 4.

In the illustrated example of FIG. 1, for a given input RGB color value ($R_{in}$, $G_{in}$, $B_{in}$) (labeled 140 in FIG. 1), the pixel conversion circuitry 110 computes the corresponding chrominance component $ChromaComponent_{in}$ of that pixel (labeled 145B in FIG. 1) according to Equation 5, which is.

$$\begin{aligned} R_{chromaIn} &= R_{in} - LumaComponent_{in} \\ G_{chromaIn} &= G_{in} - LumaComponent_{in} \\ B_{chromaIn} &= B_{in} - LumaComponent_{in} \end{aligned} \quad \text{Equation 5}$$

Thus, in some examples, the pixel conversion circuitry 110 computes the chrominance component $ChromaComponent_{in}=(R_{chromaIn}, G_{chromaIn}, B_{chromaIn})$ of an input pixel by subtracting the luminance component $LumaComponent_{in}$ from each of the ($R_{in}$, $G_{in}$, $B_{in}$) components of the input RGB color value for that pixel according to Equation 5. Note that negative values of colors are permissible in Equation 5. In some examples, the pixel conversion circuitry 110 is instantiated by processor circuitry executing pixel conversion instructions and/or configured to perform operations such as those represented by the flowchart of FIG. 6.

In the illustrated example of FIG. 1, the luminance gain circuitry 115 determines the luminance gain $g_l$ for a given pixel (labeled 150 in FIG. 1) using any appropriate technique, such as one or more of the prior algorithms described above, and/or any other technique. For example, the luminance gain circuitry 115 can implement a tone mapping look-up table (TMLUT) that defines a nonlinear relationship between input luminance components $LumaComponent_{in}$ and output luminance gains $g_l$ according to Equation 6, which is:

$$g_l = TMLUT(LumaComponent_{in}) \quad \text{Equation 6}$$

Figure 6:
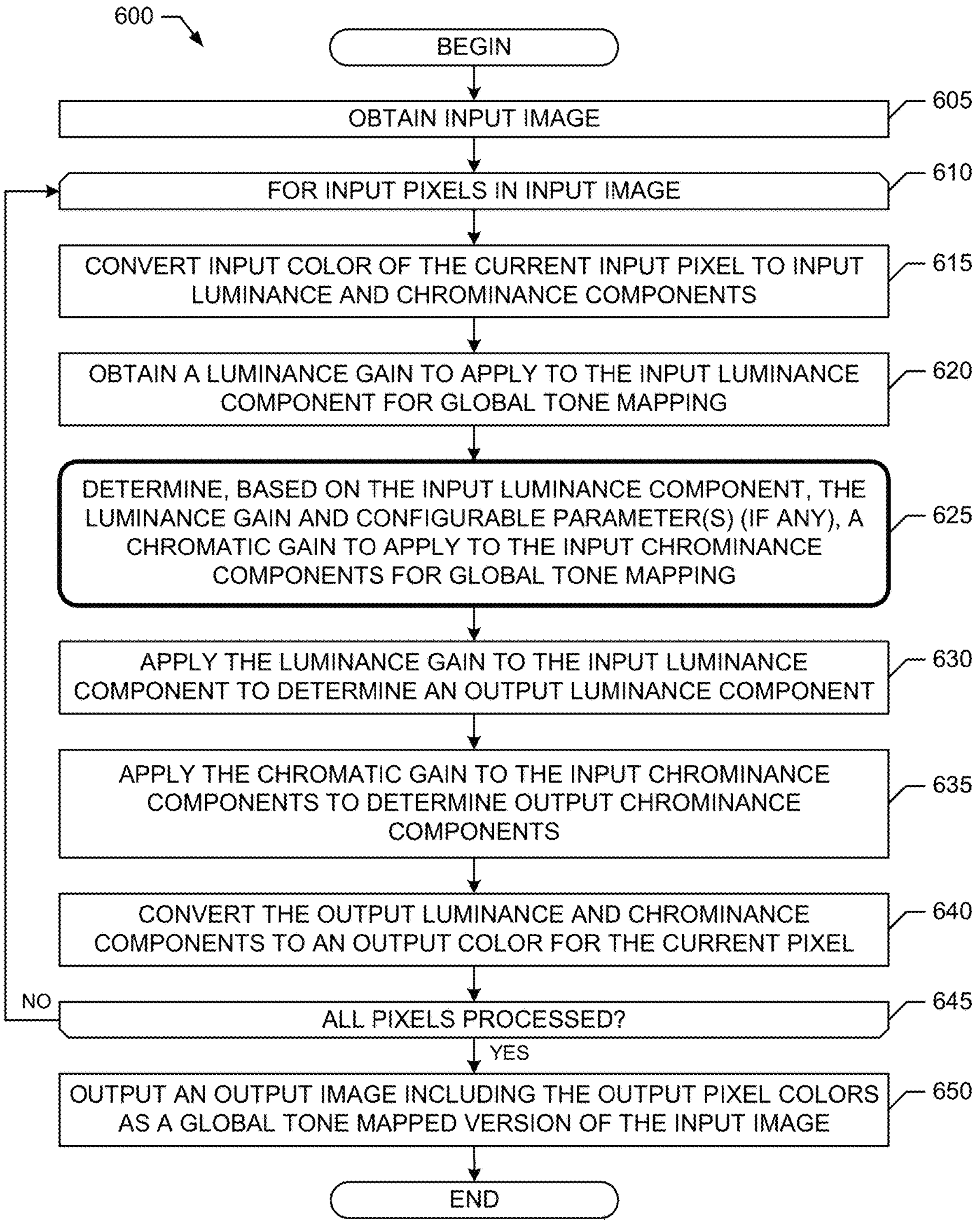
FIGS. 6-8 are flowcharts representative of example machine readable instructions and/or example operations that may be executed by example processor circuitry to implement the example global tone mapping circuitry of FIG. 1.

In some examples, the luminance gain circuitry 115 is instantiated by processor circuitry executing luminance gain instructions and/or configured to perform operations such as those represented by the flowchart of FIG. 6.

In the illustrated example of FIG. 1, the chromatic gain circuitry 120 determines the chromatic gain $g_{ch}$ for a given pixel (labeled 155 in FIG. 1) according to Equation 7, which is:

$$g_{ch} = \frac{(g_l + c) * (1 + b - g_l * LumaComponent_{in})^a}{(1 + c) * (1 + b - LumaComponent_{in})^a} \quad \text{Equation 7}$$

In Equation 7, a, b, and c are three configurable parameters (labeled 160 in FIG. 1) that control the shape of the luminance gain to chromatic gain (i.e., $g_l \rightarrow g_{ch}$) transformation. The configurable parameters are described in further detail below in connection with FIGS. 2-5. Therefore, according to Equation 7, the chromatic gain circuitry 120 determines the chromatic gain $g_{ch}$ for a given pixel based on an input luminance component of that pixel, the luminance gain for that pixel, and one or more configurable parameters. For example, the chromatic gain circuitry 120 determines the chromatic gain $g_{ch}$ based on a ratio of a numerator (e.g., $(g_l+c)*(1+b-g_l*LumaComponent_{in})^a$) and a denominator (e.g., $(1+c)*(1+b-LumaComponent_{in})^a$), with the numerator based on a first polynomial function (e.g., $(1+b-g_l*LumaComponent_{in})^a$) of the input luminance component and the luminance gain, and the denominator based on a second polynomial function (e.g., $(1+b-LumaComponent_{in})^a$) of the input luminance component. In Equation 7, the numerator and the denominator are further based on one or more configurable parameters (e.g., a, b, and c), which can include (i) an exponent parameter (e.g., a) to be applied to the first polynomial function and the second polynomial function, (ii) an offset parameter (e.g., b) such that the first polynomial function includes a first argument based on the input luminance component, the luminance gain and the offset parameter, and the second polynomial function includes a second argument based on the input luminance component and the offset parameter, and (iii) a scale parameter (e.g., c) such that the numerator is based on the first polynomial function multiplied by a first value based on scale parameter, and the denominator is based on the second polynomial function multiplied by a second value based on scale parameter.

In some examples, the chromatic gain circuitry 120 computes a chromatic gain restriction to avoid clipping-related hue changes. An example of such a chromatic gain restriction, $g_{ch}restr$, is given by Equation 8, which is:

$$R_{maxGain} = \frac{1 - LumaComponent_{in}}{R_{chromaIn}} \quad \text{Equation 8}$$

$$G_{maxGain} = \frac{1 - LumaComponent_{in}}{G_{chromaIn}}$$

$$B_{maxGain} = \frac{1 - LumaComponent_{in}}{B_{chromaIn}}$$

$$g_{ch}restr = \min(R_{maxGain}, G_{maxGain}, B_{maxGain})$$

In Equation 8, min( ) is a minimum function that outputs the minimum of the input terms, which are $R_{max\ Gain}$, $G_{max\ Gain}$, $B_{max\ Gain}$ in Equation 8. In some such examples, the chromatic gain circuitry 120 uses the chromatic gain restriction, $g_{ch}restr$, to limit, or restrict, the values of the output chromatic gain $g_{ch}$ for the given pixel according to Equation 9, which is:

$$g_{ch} = \min(g_{ch}, g_{ch}restr) \quad \text{Equation 9}$$

Therefore, in some examples, the chromatic gain circuitry 120 restricts, or limits, the chromatic gain $g_{ch}$ for a given pixel to be the minimum of the computed chromatic gain $g_{ch}$ and the chromatic gain restriction, $g_{ch}restr$. In some examples, the chromatic gain circuitry 120 is instantiated by processor circuitry executing luminance gain instructions and/or configured to perform operations such as those represented by the flowchart of FIGS. 6-8.

In the illustrated example of FIG. 1, the tonal map circuitry 125 determines an output luminance component $LumaComponent_{out}$ for a given pixel (labeled 165 in FIG. 1) by applying the luminance gain $g_l$ for that pixel to the input luminance component $LumaComponent_{in}$ of that pixel according to Equation 10, which is:

$$LumaComponent_{out} = g_l * LumaComponent_{in} \quad \text{Equation 10}$$

Therefore, according to Equation 10, the tonal map circuitry 125 determines the output luminance component $LumaComponent_{out}$ for the given pixel by multiplying the input luminance component $LumaComponent_{in}$ of that pixel by the luminance gain $g_l$ for that pixel.

In the illustrated example of FIG. 1, the tonal map circuitry 125 also determines output chrominance components $ChromaComponent_{out}=(R_{chromaOut}, G_{chromaOut}, B_{chromaOut})$ for a given pixel (labeled 170 in FIG. 1) by applying the chromatic gain $g_{ch}$ for that pixel to the input chrominance components $ChromaComponent_{in}=(R_{chromaIn}, G_{chromaIn}, B_{chromaIn})$ of that pixel according to Equation 11, which is:

$$R_{chromaOut} = g_{ch} * R_{chromaIn} \quad \text{Equation 11}$$

$$G_{chromaOut} = g_{ch} * G_{chromaIn}$$

$$B_{chromaOut} = g_{ch} * B_{chromaIn}$$

Therefore, according to Equation 11, the tonal map circuitry 125 determines the output chrominance components $ChromaComponent_{out}=(R_{chromaOut}, G_{chromaOut}, B_{chromaOut})$ for the given pixel by multiplying the input chrominance components $ChromaComponent_{in}=(R_{chromaIn}, G_{chromaIn}, B_{chromaIn})$ of that pixel by the chromatic gain $g_{ch}$ for that pixel. In some examples, the tonal map circuitry 125 is instantiated by processor circuitry executing tonal map instructions and/or configured to perform operations such as those represented by the flowchart of FIG. 6.

In the illustrated example of FIG. 1, the pixel conversion circuitry 110 then combines the output luminance component $LumaComponent_{out}$ and the output chrominance components $ChromaComponent_{out}=(R_{chromaOut}, G_{chromaOut}, B_{chromaOut})$ for a given pixel to determine an RGB output color ($R_{out}$, $G_{out}$, $B_{out}$) of the pixel (labeled 175 in FIG. 1) according to Equation 12, which is:

$$R_{out} = LumaComponent_{out} + R_{chromaOut}$$
$$G_{out} = LumaComponent_{out} + G_{chromaOut}$$
$$B_{out} = LumaComponent_{out} + B_{chromaOut}$$

Equation 12

Then, the image interface circuitry 105 outputs the output image 135 containing the tonal mapped pixels, which corresponds to the tone mapped version of the input image 130.

In some example, if the luminance gain $g_l$ determined by the luminance gain circuitry 115 for a given pixel is less than one (i.e., $g_l \leq 1$), the luminance gain circuitry 115 then (i) causes (e.g., instructions) the pixel conversion circuitry 110 to skip computation of the corresponding chrominance component $ChromaComponent_{in}$ of that pixel, (ii) causes (e.g. instructs) the chromatic gain circuitry 120 and example tonal map circuitry 125 to not execute their respective processing (e.g., to sleep), and (iii) causes (e.g., instructs) the pixel conversion circuitry 110 to apply just the luminance gain $g_l$ to the ($R_{in}$, $G_{in}$, $B_{in}$) components of the input RGB color value for that pixel to determine an RGB output color ($R_{Out}$, $G_{Out}$, $B_{Out}$) of the pixel according to Equation 13, which is:

$$R_{out} = g_l * R_{in}$$
$$G_{out} = g_l * G_{in}$$
$$B_{out} = g_l * B_{in}$$

Equation 13

Figure 2:
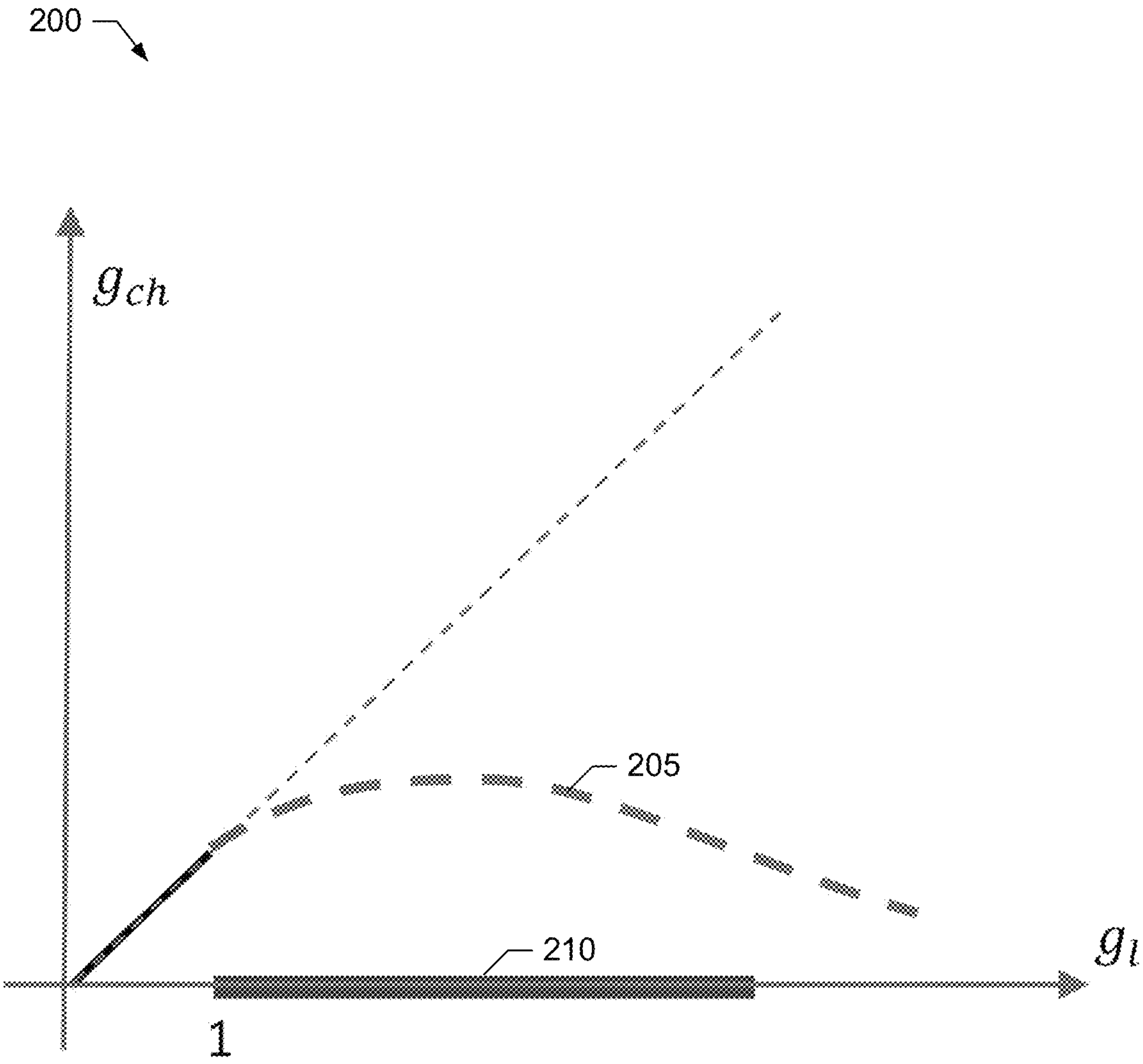
FIG. 2 is a graph illustrating example chromatic gains determined by the example global tone mapping circuitry of FIG. 1.

FIG. 2 is an example graph 200 illustrating example chromatic gains determined by the example global tone mapping circuitry 100 of FIG. 1. The graph 200 illustrates that the global tone mapping circuitry 100 operates to transform a luminance gain ($g_l$) to a chromatic gain ($g_{ch}$). As describes above, when $g_l>1$, the global tone mapping circuitry 100 transforms the luminance gain $g_l$ for a given pixel to the chromatic gain $g_{ch}$ for that pixel based on the input luminance $L_{in}$ of that pixel and three configurable parameters a, b and c according to Equation 14, which is:

$$g_{ch} = \frac{(g_l + c) * (1 + b - g_{ch} * L_{in})^a}{(1 + c) * (1 + b - L_{in})^a}$$

Equation 14

As shown in the example graph 200, Equation 14 defines a polynomial curve when $g_l>1$. At the point $g_l=1$, the luminance gain has no effect, and it also does not affect the chromatic gain either. For higher luminance gains $g_l>1$, the chromatic gain $g_{ch}$ decreases and then levels off at some point. In the example graph 200, the dotted line 205 illustrates chromatic desaturation as a function of brightness gain, and the segment 210 illustrates where the gain is meaningful before color clipping.

Figure 3:
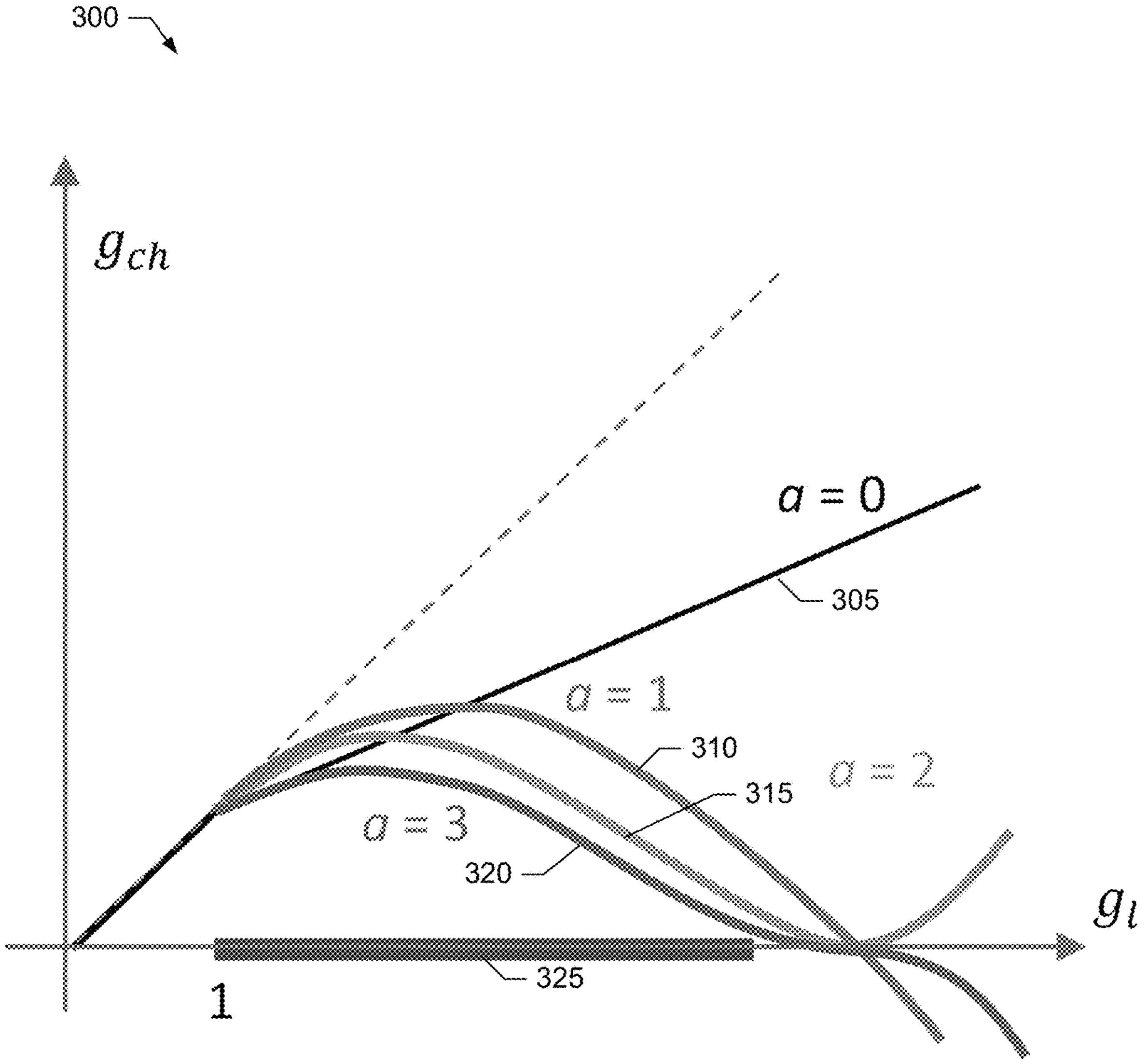
FIGS. 3-5 are graphs illustrating example effects of one or more configurable parameters on the chromatic gains determined by the example global tone mapping circuitry of FIG. 1.

FIG. 3 is an example graph 300 illustrating the effect of the exponent parameter a on the chromatic gain $g_{ch}$ computed according to Equation 14. In Equation 14, the exponent parameter a defines an exponent of the resulting polynomial. In some examples, the polynomial may have a degree from 1 to 4 that corresponds to $a \in \{0, 1, 2, 3\}$. The example graph 300 illustrates different shapes 305-320 of the polynomial $g_l \rightarrow g_{ch}$ conversion defined by the exponent parameter a. The segment 325 illustrates where the gain is meaningful before color clipping.

Figure 4:
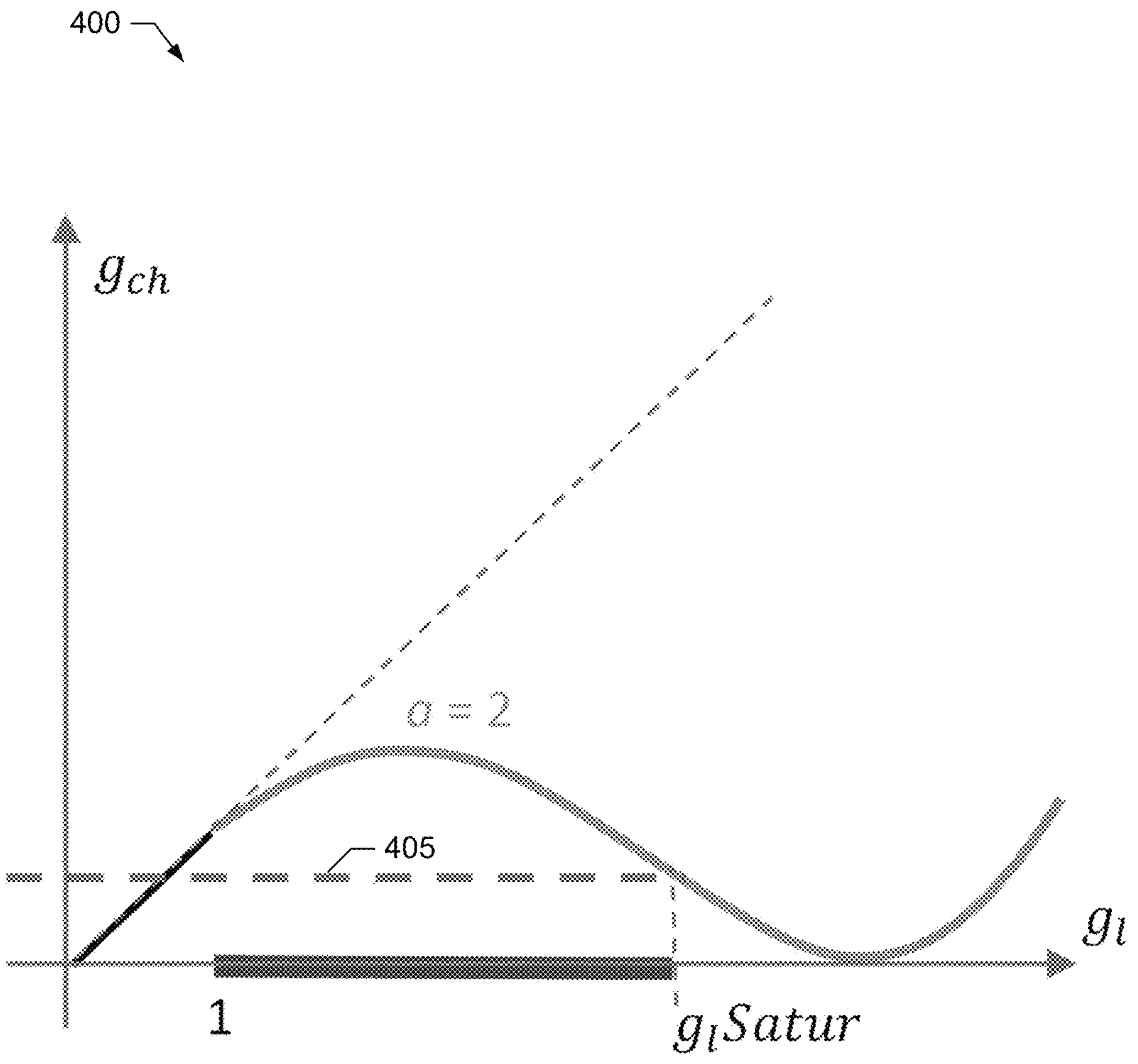

FIG. 4 is an example graph 400 illustrating the effect of the offset parameter b on the chromatic gain $g_{ch}$ computed according to Equation 14. In Equation 14, the offset parameter b defines the chromatic effect for high gained pixels. A higher value of b means more saturated highlights in the output image. In the example graph 400, the offset parameter b controls the high gained pixels chromaticity, which corresponds to the height of the dashed line 405, when the image colors are close to clipping at $g_1$Satur.

Figure 5:
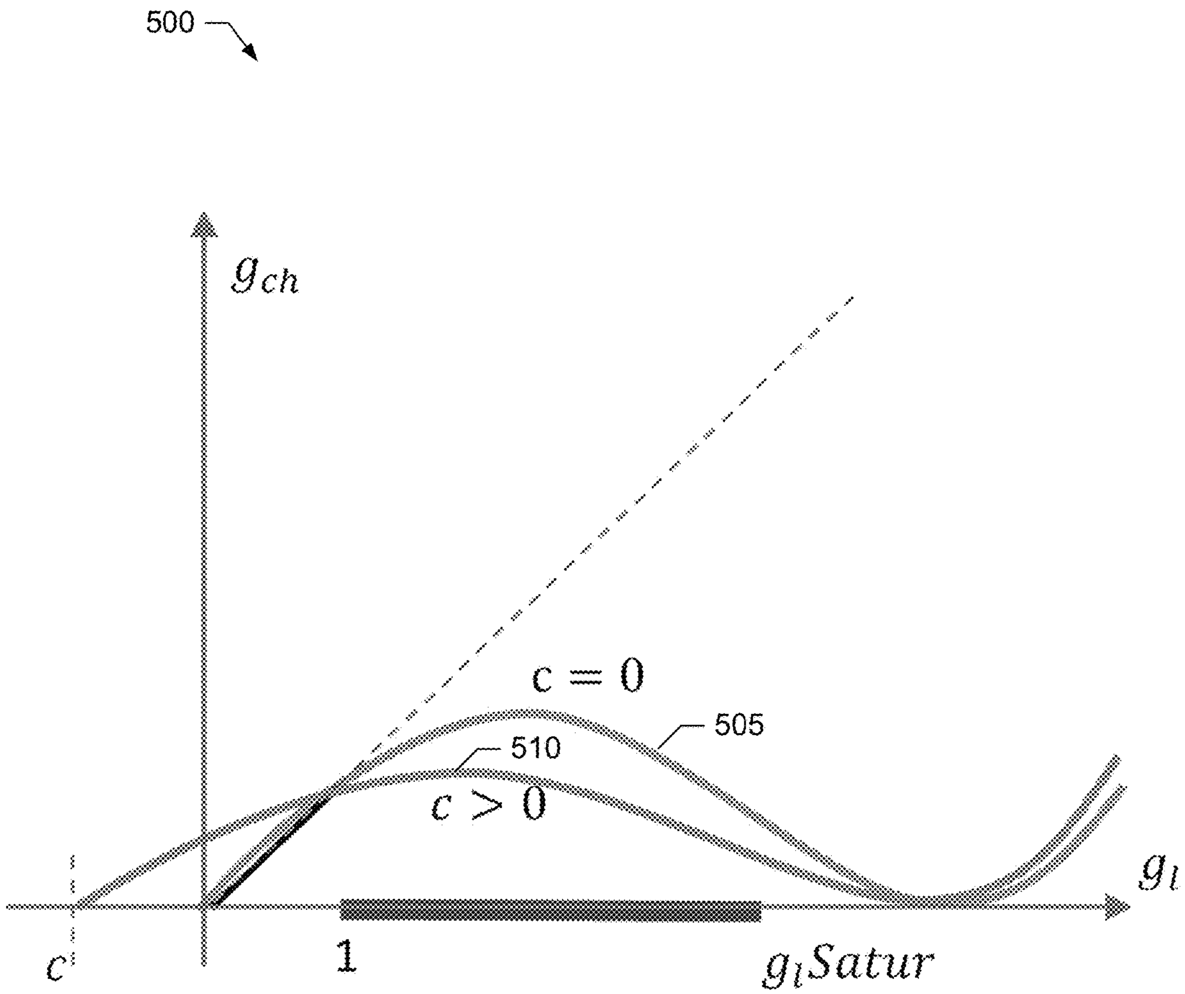

FIG. 5 is an example graph 500 illustrating the effect of the scale parameter c on the chromatic gain $g_{ch}$ computed according to Equation 14. In Equation 14, the scale parameter c defines the main chromatic effect. A higher value of c means a more desaturated output image. The example graph 500 illustrates an example curve 505 for c=0 and an example curve 510 for c>0.

In some examples, the global tone mapping circuitry 100 includes means for inputting and outputting images. For example, the means for inputting and outputting images may be implemented by the example image interface circuitry 105. In some examples, the image interface circuitry 105 may be instantiated by processor circuitry such as the example processor circuitry 912 of FIG. 9. For instance, the image interface circuitry 105 may be instantiated by the example microprocessor 1000 of FIG. 10 executing machine executable instructions such as those implemented by at least blocks 605 and 650 of FIG. 6. In some examples, the image interface circuitry 105 may be instantiated by hardware logic circuitry, which may be implemented by an ASIC, XPU, or the FPGA circuitry 1100 of FIG. 11 structured to perform operations corresponding to the machine readable instructions. Additionally or alternatively, the image interface circuitry 105 may be instantiated by any other combination of hardware, software, and/or firmware. For example, the image interface circuitry 105 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the global tone mapping circuitry 100 includes means for converting pixel color representations. For example, the means for converting pixel color representations may be implemented by the example pixel conversion circuitry 110. In some examples, the pixel conversion circuitry 110 may be instantiated by processor circuitry such as the example processor circuitry 912 of FIG. 9. For instance, the pixel conversion circuitry 110 may be instantiated by the example microprocessor 1000 of FIG. 10 executing machine executable instructions such as those implemented by at least blocks 615 and 640 of FIG. 6. In some examples, the pixel conversion circuitry 110 may be instantiated by hardware logic circuitry, which may be implemented by an ASIC, XPU, or the FPGA circuitry 1100 of FIG. 11 structured to perform operations corresponding to the machine readable instructions. Additionally or alternatively, the pixel conversion circuitry 110 may be instantiated by any other combination of hardware, software, and/or firmware. For example, the pixel conversion circuitry 110 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the global tone mapping circuitry 100 includes means for determining a luminance gain. For example, the means for determining a luminance gain may be implemented by the example luminance gain circuitry 115. In some examples, the luminance gain circuitry 115 may be instantiated by processor circuitry such as the example processor circuitry 912 of FIG. 9. For instance, luminance gain circuitry 115 may be instantiated by the example microprocessor 1000 of FIG. 10 executing machine executable instructions such as those implemented by at least block 620 of FIG. 6. In some examples, the luminance gain circuitry 115 may be instantiated by hardware logic circuitry, which may be implemented by an ASIC, XPU, or the FPGA circuitry 1100 of FIG. 11 structured to perform operations corresponding to the machine readable instructions. Additionally or alternatively, the luminance gain circuitry 115 may be instantiated by any other combination of hardware, software, and/or firmware. For example, the luminance gain circuitry 115 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the global tone mapping circuitry 100 includes means for determining a chromatic gain. For example, the means for determining a luminance gain may be implemented by the example chromatic gain circuitry 120. In some examples, the chromatic gain circuitry 120 may be instantiated by processor circuitry such as the example processor circuitry 912 of FIG. 9. For instance, chromatic gain circuitry 120 may be instantiated by the example microprocessor 1000 of FIG. 10 executing machine executable instructions such as those implemented by at least blocks 625 of FIG. 6, blocks 705-725 of FIG. 7, and/or blocks 805-835 of FIG. 8. In some examples, the chromatic gain circuitry 120 may be instantiated by hardware logic circuitry, which may be implemented by an ASIC, XPU, or the FPGA circuitry 1100 of FIG. 11 structured to perform operations corresponding to the machine readable instructions. Additionally or alternatively, the chromatic gain circuitry 120 may be instantiated by any other combination of hardware, software, and/or firmware. For example, the chromatic gain circuitry 120 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the global tone mapping circuitry 100 includes means for applying the luminance and chromatic gains. For example, the means for applying the luminance and chromatic gains may be implemented by the example tonal map circuitry 125. In some examples, the tonal map circuitry 125 may be instantiated by processor circuitry such as the example processor circuitry 912 of FIG. 9. For instance, the tonal map circuitry 125 may be instantiated by the example microprocessor 1000 of FIG. 10 executing machine executable instructions such as those implemented by at least blocks 630 and 635 of FIG. 6. In some examples, the tonal map circuitry 125 may be instantiated by hardware logic circuitry, which may be implemented by an ASIC, XPU, or the FPGA circuitry 1100 of FIG. 11 structured to perform operations corresponding to the machine readable instructions. Additionally or alternatively, the tonal map circuitry 125 may be instantiated by any other combination of hardware, software, and/or firmware. For example, the tonal map circuitry 125 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the global tone mapping circuitry 100 is illustrated in FIGS. 1-5, one or more of the elements, processes, and/or devices illustrated in FIGS. 1-5 may be combined, divided, re-arranged, omitted, eliminated, and/or implemented in any other way. Further, the example image interface circuitry 105, the example pixel conversion circuitry 110, the example luminance gain circuitry 115, the example chromatic gain circuitry 120, the example tonal map circuitry 125, and/or, more generally, the example global tone mapping circuitry 100 of FIG. 1 may be implemented by hardware alone or by hardware in combination with software and/or firmware. Thus, for example, any of the example image interface circuitry 105, the example pixel conversion circuitry 110, the example luminance gain circuitry 115, the example chromatic gain circuitry 120, the example tonal map circuitry 125, and/or, more generally, the example global tone mapping circuitry 100 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example global tone mapping circuitry 100 may include one or more elements, processes, and/or devices in addition to, or instead of, those illustrated in FIGS. 1-5, and/or may include more than one of any or all of the illustrated elements, processes and devices.

Figure 7:
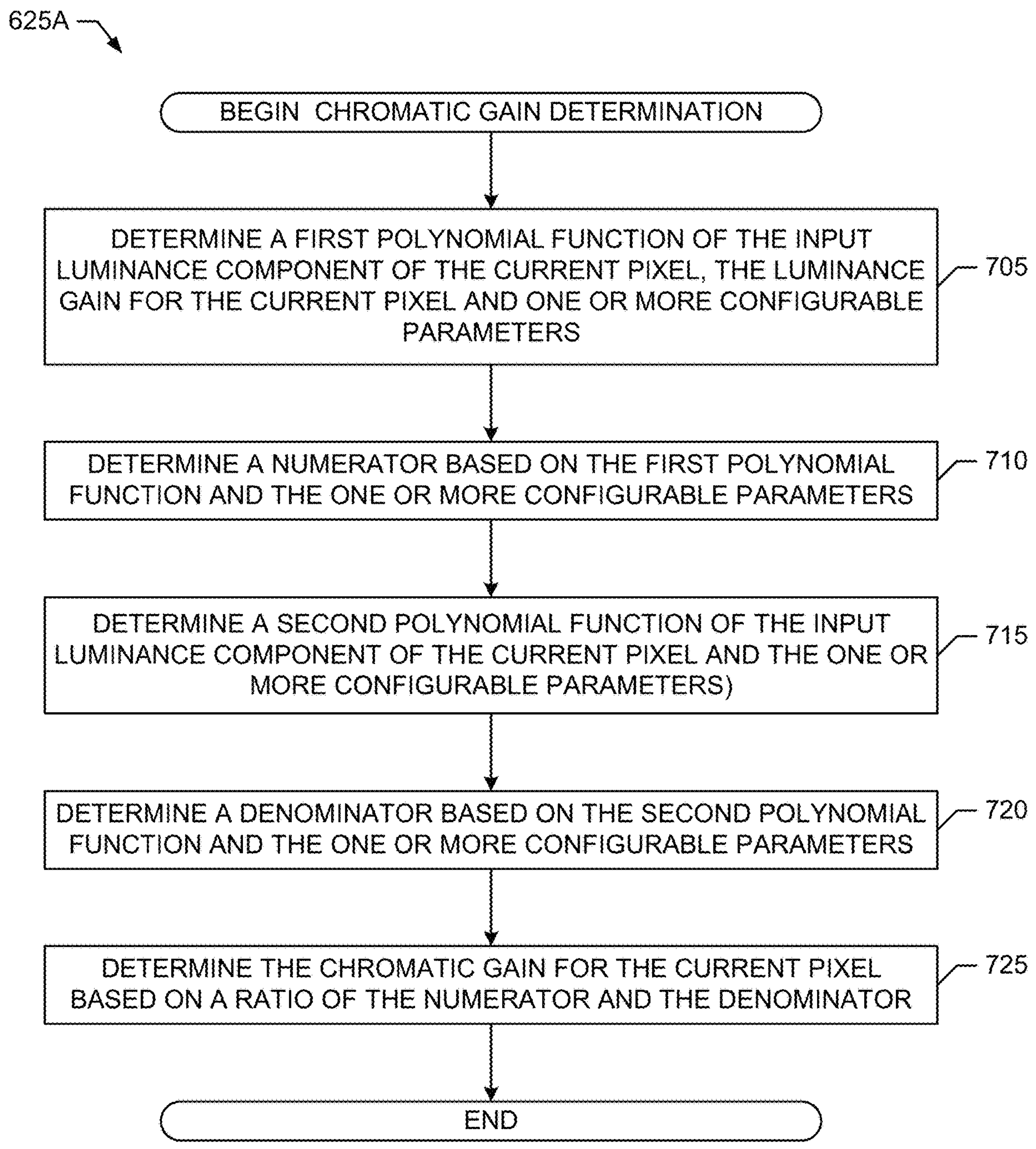
Figure 8:
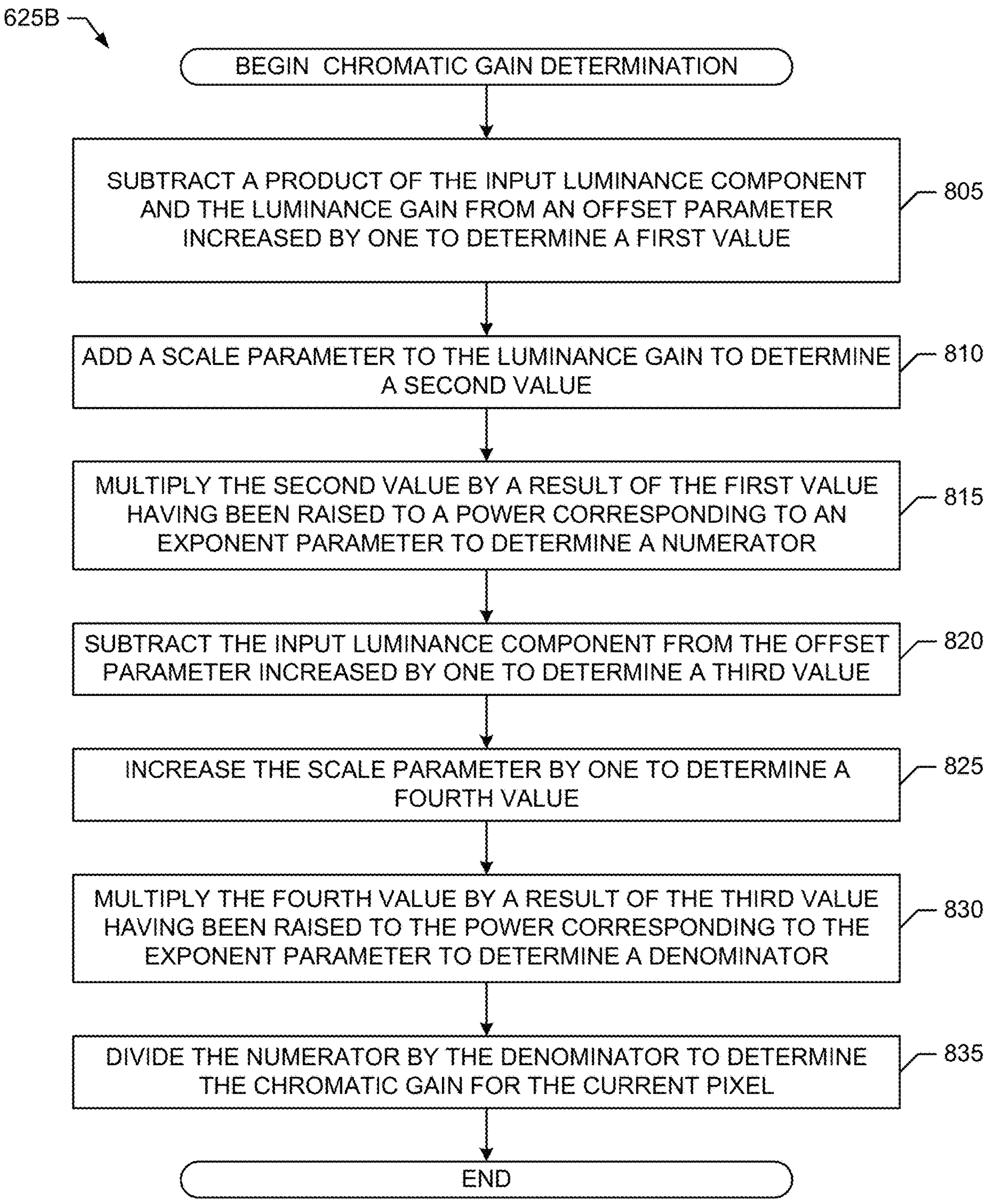

Flowcharts representative of example machine readable instructions, which may be executed to configure processor circuitry to implement the example global tone mapping circuitry 100 is shown in FIGS. 6-8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program(s) or portions thereof may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is(are) described with reference to the flowcharts illustrated in FIGS. 6-8, many other methods of implementing the example global tone mapping circuitry 100 may alternatively be used. For example, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 6-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms “computer readable storage device” and “machine readable storage device” are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to implement the example global tone mapping circuitry 100 to perform global tone mapping of images based on luminance and chrominance in accordance with teachings of this disclosure. With reference to the preceding figures and associated written descriptions, the machine readable instructions and/or the operations 600 of FIG. 6 begin at block 605, at which the example image interface circuitry 105 of the global tone mapping circuitry 100 obtains an input image 130, as described above. At block 610, the global tone mapping circuitry 100 begins iterating over each input pixel of the input image 130. For example, at block 615, the example pixel conversion circuitry 110 of the global tone mapping circuitry 100 converts an input color of the current input pixel to input luminance and chrominance components, as described above. At block 620, the example luminance gain circuitry 115 of the global tone mapping circuitry 100 obtains a luminance gain for the current pixel to apply to the input luminance component of the current pixel for global tone mapping, as described above.

At block 625, the example chromatic gain circuitry 120 of the global tone mapping circuitry 100 determines a chromatic gain for the current pixel to apply to the input chrominance components of the current pixel for global tone mapping, as described above. For example, at block 625, the chromatic gain circuitry 120 determines the chromatic gain for the current pixel based on the input luminance component of the current pixel, the luminance gain for the current pixel, and configurable parameter(s) (if any), as described above. Example machine readable instructions and/or example operations that may be executed and/or instantiated to implement the processing at block 625 are illustrated in FIGS. 7-8, which are described in further detail below.

At block 630, the example tonal map circuitry 125 of the global tone mapping circuitry 100 applies the luminance gain to the input luminance component to determine an output luminance component for the current pixel, as described above. At block 635, the example tonal map circuitry 125 of the global tone mapping circuitry 100 applies the chromatic gain to the input chrominance components to determine output chrominance component for the current pixel, as described above. At block 640, the pixel conversion circuitry 110 converts the output luminance and chrominance components to an output color of the current pixel, as described above. At block 645, the global tone mapping circuitry 100 continues iterating until all pixels of the input image 130 have been processed. Then, at block 650, the image interface circuitry 105 outputs an output image 135 including the output pixel colors determined at block 640 as the global tone mapped version of the input image 130, as described above. The example machine readable instructions and/or example operations 600 then end.

FIG. 7 is a flowchart representative of first example machine readable instructions and/or example operations 625A that may be executed and/or instantiated by processor circuitry to implement the example chromatic gain circuitry 120 to perform the processing at block 625 of FIG. 6. With reference to the preceding figures and associated written descriptions, the machine readable instructions and/or the operations 625A of FIG. 7 begin at block 705, at which the chromatic gain circuitry 120 determines a first polynomial function of the input luminance component of the current pixel, the luminance gain for the current pixel and one or more configurable parameters, as described above. At block 710, the chromatic gain circuitry 120 determines a numerator based on the first polynomial function and the one or more configurable parameters, as described above. At block 715, the chromatic gain circuitry 120 determines a second polynomial function of the input luminance component of the current pixel and the one or more configurable parameters, as described above. At block 720, the chromatic gain circuitry 120 determines a denominator based on the second polynomial function and the one or more configurable parameters, as described above. At block 725, the chromatic gain circuitry 120 determines the chromatic gain for the current pixel based on a ration of the numerator and the denominator, as described above. The first example machine readable instructions and/or example operations 625A then end.

FIG. 8 is a flowchart representative of second example machine readable instructions and/or example operations 625B that may be executed and/or instantiated by processor circuitry to implement the example chromatic gain circuitry 120 to perform the processing at block 625 of FIG. 6. With reference to the preceding figures and associated written descriptions, the machine readable instructions and/or the operations 625B of FIG. 8 begin at block 805, at which the chromatic gain circuitry 120 subtracts a product of the input luminance component of the current pixel and the luminance gain for the current pixel from an offset parameter increased by one to determine a first value (e.g., (1+b−$g_l$*$\text{LumaComponent}_{in}$) of Equation 7). At block 810, the chromatic gain circuitry 120 adds a scale parameter to the luminance gain to determine a second value (e.g., ($g_l$+c) of Equation 7). At block 815, the chromatic gain circuitry 120 multiplies the second value by a result of the first value having been raised to a power corresponding to an exponent parameter to determine a numerator (e.g., ($g_l$+c)*(1+b−$g_l$*$\text{LumaComponent}_{in})^a$ of Equation 7). At block 820, the chromatic gain circuitry 120 subtracts the input luminance component from the offset parameter increased by one to determine a third value (e.g., (1+b−$\text{LumaComponent}_{in})^a$ of Equation 7). At block 825, the chromatic gain circuitry 120 increases the scale parameter by one to determine a fourth value (e.g., (1+c) of Equation 7). At block 830, the chromatic gain circuitry 120 multiplies the fourth value by a result of the third value having been raised to the exponent parameter to determine a denominator (e.g., (1+c)*(1+b−$\text{LumaComponent}_{in})^a$ of Equation 7). At block 835, the chromatic gain circuitry 120 divides the numerator by the denominator to determine the chromatic gain for the current pixel (e.g., [($g_l$+c)*(1+b−$g_l$*$\text{LumaComponent}_{in})^a$]/[(1+c)*(1+b−$\text{LumaComponent}_{in})^a$] of Equation 7). The second example machine readable instructions and/or example operations 625B then end.

Figure 9:
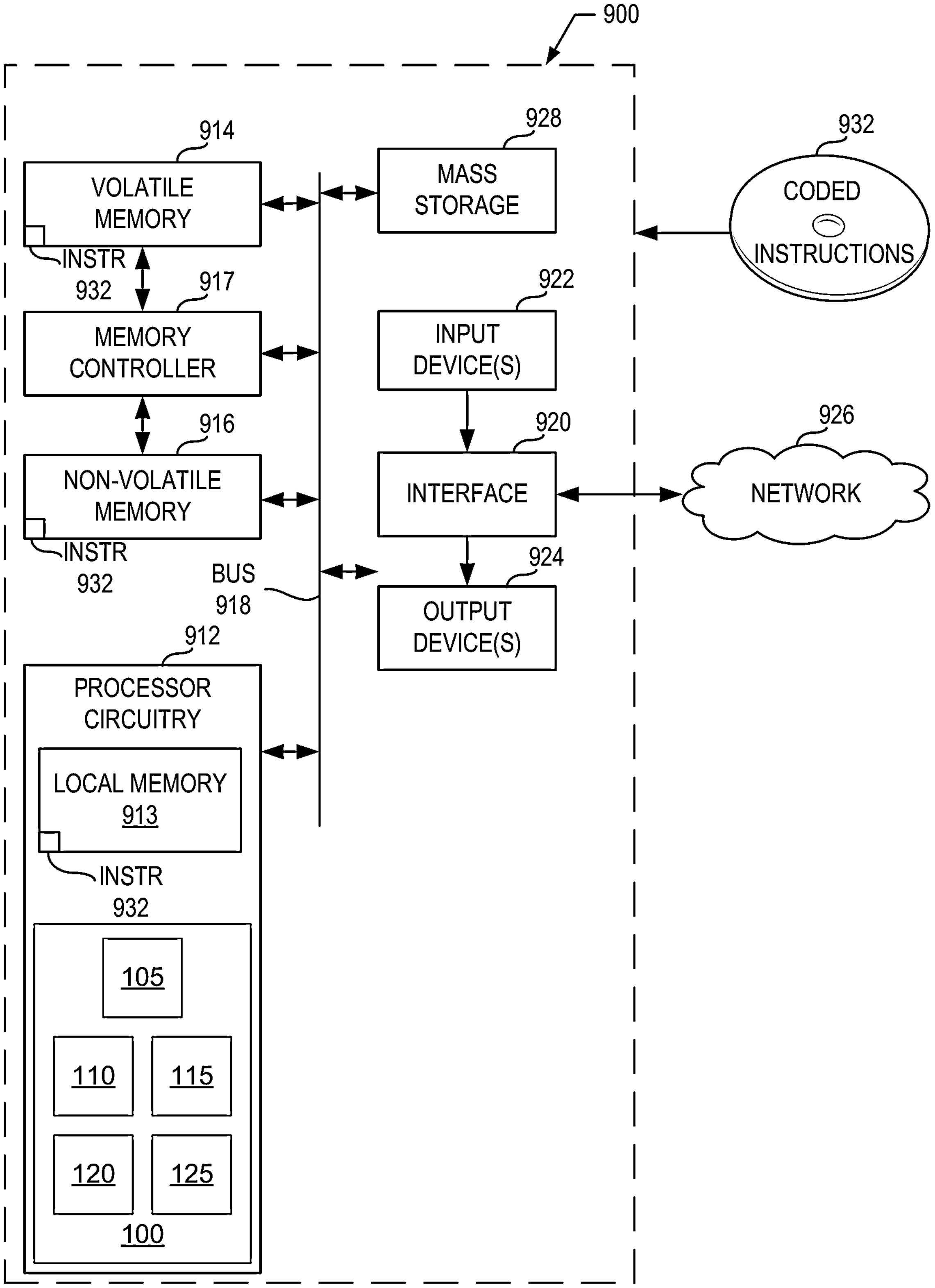
FIG. 9 is a block diagram of an example processing platform including processor circuitry structured to execute the example machine readable instructions and/or the example operations of FIGS. 6, 7 and/or 8 to implement the example multi-engine meter of FIG. 1.

FIG. 9 is a block diagram of an example processor platform 900 structured to execute and/or instantiate the machine readable instructions and/or the operations of FIGS. 6-8 to implement the example global tone mapping circuitry 100 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example image interface circuitry 105, the example pixel conversion circuitry 110, the example luminance gain circuitry 115, the example chromatic gain circuitry 120, the example tonal map circuitry 125, and/or, more generally, the example global tone mapping circuitry 100 of FIG. 1.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, a trackbar, an isopoint device, a voice recognition system and/or any other human-machine interface. In some examples, the input device(s) 922 are arranged or otherwise configured to allow the user to control the processor platform 900 and provide data to the processor platform 900 using physical gestures, such as, but not limited to, hand or body movements, facial expressions, face recognition, etc.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIGS. 6-8, may be stored in the mass storage device 928, in the volatile memory 914, in the non-volatile memory 916, and/or on a removable non-transitory computer readable storage medium such as a CD or DVD.

Figure 10:
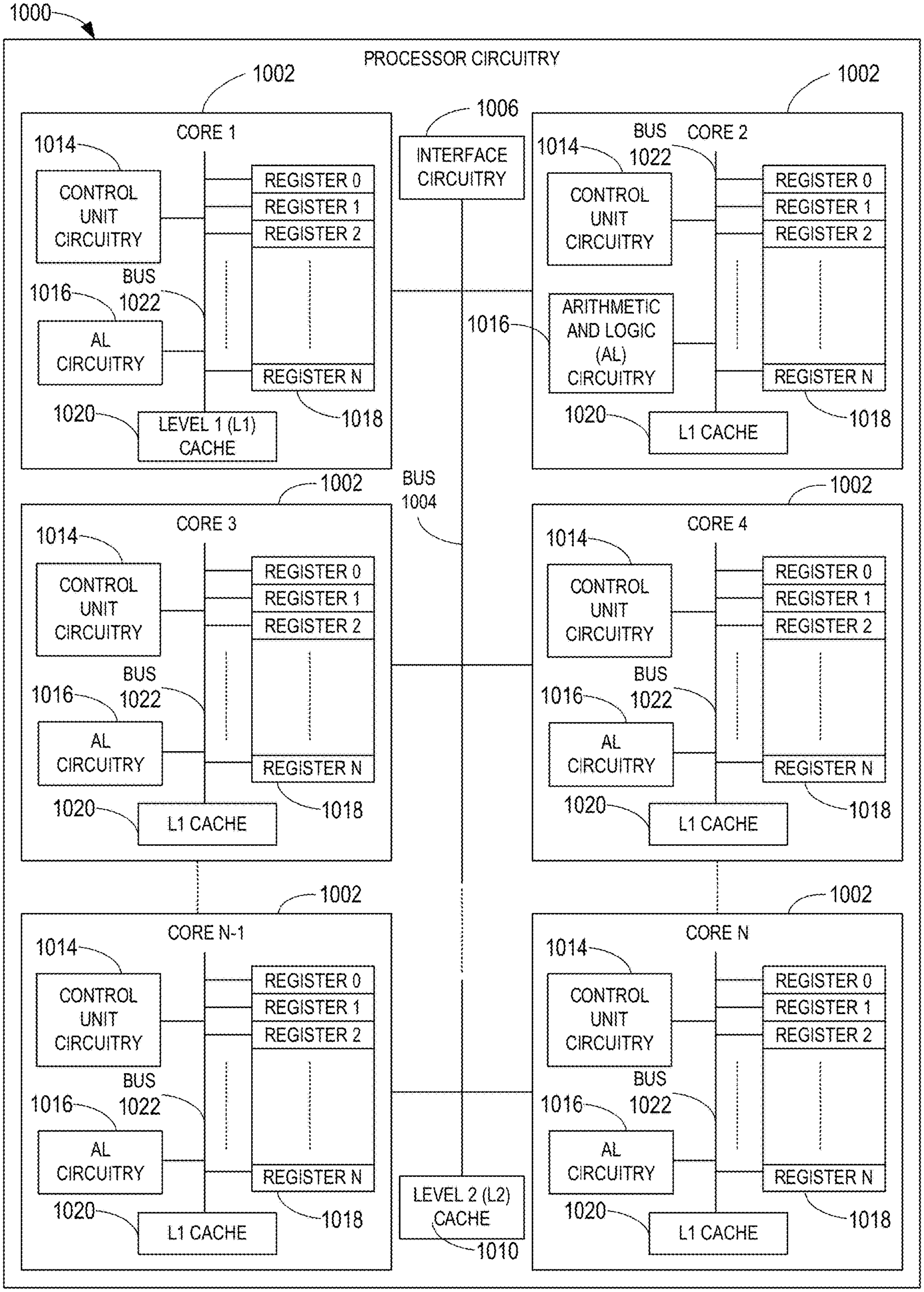
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowcharts of FIGS. 6-8 to effectively instantiate the example global tone mapping circuitry 100 of FIG. 1 as logic circuits to perform the operations corresponding to those machine readable instructions. In some such examples, the example global tone mapping circuitry 100 of FIG. 1 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 6-8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
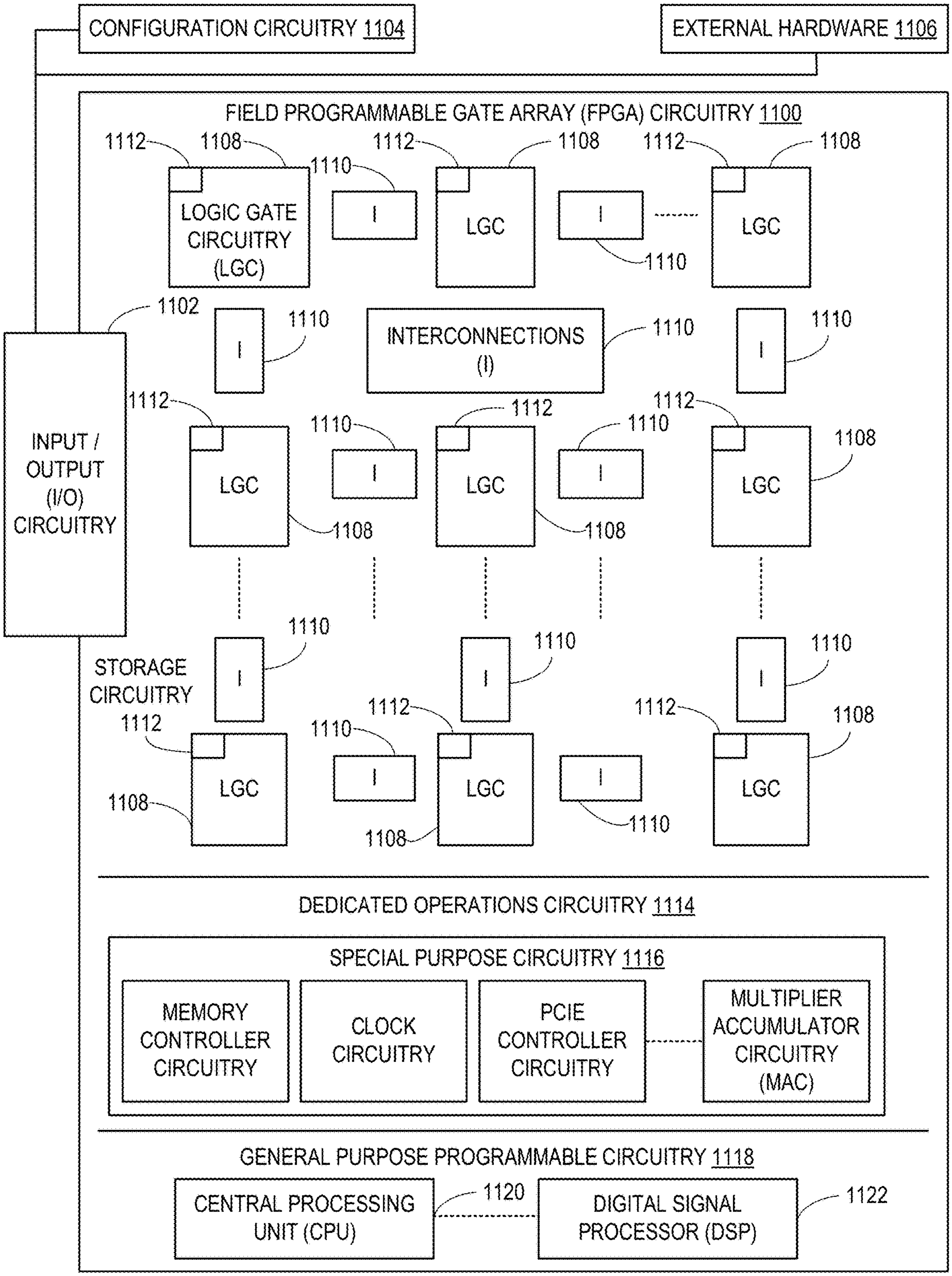
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 6-8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 6-8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 6-8. As such, the FPGA circuitry 1100 may be structured to effectively instantiate some or all of the machine readable instructions of the flowcharts of FIGS. 6-8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 6-8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIGS. 6-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 6-8 may be executed by one or more of the cores 1002 of FIG. 10, a second portion of the machine readable instructions represented by the flowcharts of FIGS. 6-8 may be executed by the FPGA circuitry 1100 of FIG. 11, and/or a third portion of the machine readable instructions represented by the flowcharts of FIGS. 6-8 may be executed by an ASIC. It should be understood that some or all of the circuitry of FIG. 1 may, thus, be instantiated at the same or different times. Some or all of the circuitry may be instantiated, for example, in one or more threads executing concurrently and/or in series. Moreover, in some examples, some or all of the circuitry of FIG. 1 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
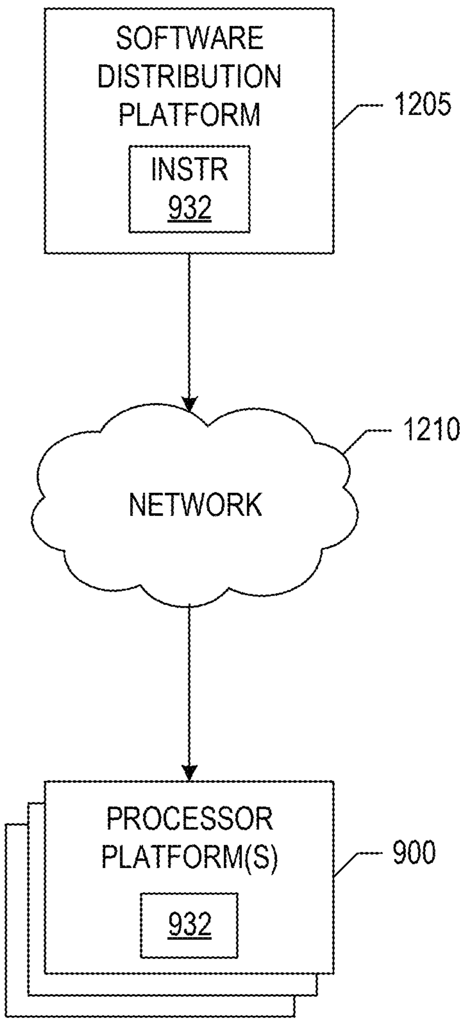
FIG. 12 is a block diagram of an example software distribution platform (e.g., one or more servers) to distribute software (e.g., software corresponding to the example machine readable instructions of FIGS. 6, 7 and/or 8) to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions of FIGS. 6-8, as described above. The one or more servers of the example software distribution platform 1205 are in communication with an example network 1210, which may correspond to any one or more of the Internet and/or any of the example networks 926 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions of FIGS. 6-8, may be downloaded to the example processor platform 900, which is to execute the machine readable instructions 932 to implement the example global tone mapping circuitry 100. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that implement global tone mapping of images based on luminance and chrominance. Disclosed systems, methods, apparatus, and articles of manufacture are accordingly directed to one or more improvement(s) in the operation of a machine such as a computer or other electronic and/or mechanical device. Further examples and combinations thereof include the following:

Example 1 includes an apparatus to perform tone mapping of an input image, the apparatus comprising at least one memory, machine readable instructions, and processor circuitry to at least one of instantiate or execute the machine readable instructions to determine a chromatic gain to apply to input chrominance components corresponding to an input color of a pixel of the input image, the chromatic gain based on an input luminance component corresponding to the input color of the pixel and a luminance gain to be applied to the input luminance component of the pixel to determine an output luminance component of the pixel, apply the chromatic gain to the input chrominance components of the pixel to determine output chrominance components of the pixel, and combine the output luminance component and the output chrominance components to determine an output color of the pixel.

Example 2 includes the apparatus of example 1, wherein the processor circuitry is to determine the chromatic gain based on the input luminance component, the luminance gain and one or more configurable parameters.

Example 3 includes the apparatus of example 1 or example 2, wherein the processor circuitry is to determine the chromatic gain based on a ratio of a numerator and a denominator, the numerator based on a first polynomial function of the input luminance component and the luminance gain, the denominator based on a second polynomial function of the input luminance component.

Example 4 includes the apparatus of any one of examples 1 to 3, wherein the numerator and the denominator are further based on one or more configurable parameters.

Example 5 includes the apparatus of any one of examples 1 to 4, wherein the one or more configurable parameters include an exponent parameter to be applied to the first polynomial function and the second polynomial function.

Example 6 includes the apparatus of any one of examples 1 to 5, wherein the one or more configurable parameters include an offset parameter, the first polynomial function includes a first argument based on the input luminance component, the luminance gain and the offset parameter, and the second polynomial function includes a second argument based on the input luminance component and the offset parameter.

Example 7 includes the apparatus of any one of examples 1 to 6, wherein the one or more configurable parameters include a scale parameter, the numerator is based on the first polynomial function multiplied by a first value based on scale parameter, and the denominator is based on the second polynomial function multiplied by a second value based on scale parameter.

Example 8 includes the apparatus of any one of examples 1 to 7, wherein to determine the chromatic gain, the processor circuitry is to subtract a product of the input luminance component and the luminance gain from an offset parameter increased by one to determine a first value, add a scale parameter to the luminance gain to determine a second value, multiply the second value by a result of the first value having been raised to a power corresponding to an exponent parameter to determine a numerator, subtract the input luminance component from the offset parameter increased by one to determine a third value, increase the scale parameter by one to determine a fourth value, multiply the fourth value by a result of the third value having been raised to the power corresponding to the exponent parameter to determine a denominator, and divide the numerator by the denominator to determine the chromatic gain.

Example 9 includes at least one non-transitory computer readable medium comprising computer readable instructions that, when executed, cause one or more processors to at least calculate a chromatic gain to apply to input chrominance components corresponding to an input color of a pixel of an input image, the chromatic gain based on an input luminance component corresponding to the input color of the pixel and a luminance gain to be applied to the input luminance component of the pixel to determine an output luminance component of the pixel, adjust the input chrominance components of the pixel based on the chromatic gain to determine output chrominance components of the pixel, and determine an output color of the pixel based on the output luminance component and the output chrominance components.

Example 10 includes the at least one non-transitory computer readable medium of example 9, wherein the instructions are to cause the one or more processors to calculate the chromatic gain based on the input luminance component, the luminance gain and one or more configurable parameters.

Example 11 includes the at least one non-transitory computer readable medium of example 9 or example 10, wherein the instructions are to cause the one or more processors to calculate the chromatic gain based on a ratio of a numerator and a denominator, the numerator based on a first polynomial function of the input luminance component and the luminance gain, the denominator based on a second polynomial function of the input luminance component.

Example 12 includes the at least one non-transitory computer readable medium of any one of examples 9 to 11, wherein the numerator and the denominator are further based on one or more configurable parameters.

Example 13 includes the at least one non-transitory computer readable medium of any one of examples 9 to 12, wherein the one or more configurable parameters include an exponent parameter to be applied to the first polynomial function and the second polynomial function.

Example 14 includes the at least one non-transitory computer readable medium of any one of examples 9 to 13, wherein the one or more configurable parameters include an offset parameter, the first polynomial function includes a first argument based on the input luminance component, the luminance gain and the offset parameter, and the second polynomial function includes a second argument based on the input luminance component and the offset parameter.

Example 15 includes the at least one non-transitory computer readable medium of any one of examples 9 to 14, wherein the one or more configurable parameters include a scale parameter, the numerator is based on the first polynomial function multiplied by a first value based on scale parameter, and the denominator is based on the second polynomial function multiplied by a second value based on scale parameter.

Example 16 includes the at least one non-transitory computer readable medium of any one of examples 9 to 15, wherein to calculate the chromatic gain, the instructions are to cause the one or more processors to subtract a product of the input luminance component and the luminance gain from an offset parameter increased by one to determine a first value, add a scale parameter to the luminance gain to determine a second value, multiply the second value by a result of the first value having been raised to a power corresponding to an exponent parameter to determine a numerator, subtract the input luminance component from the offset parameter increased by one to determine a third value, increase the scale parameter by one to determine a fourth value, multiply the fourth value by a result of the third value having been raised to the power corresponding to the exponent parameter to determine a denominator, and divide the numerator by the denominator to determine the chromatic gain.

Example 17 includes a method to perform tone mapping of an input image, the method comprising calculating a chromatic gain to apply to input chrominance components corresponding to an input color of a pixel of an input image, the chromatic gain based on an input luminance component corresponding to the input color of the pixel and a luminance gain to be applied to the input luminance component of the pixel to determine an output luminance component of the pixel, applying the chromatic gain to the input chrominance components of the pixel to determine output chrominance components of the pixel, and determining an output color of the pixel based on the output luminance component and the output chrominance components.

Example 18 includes the method of example 17, wherein the calculating of the chromatic gain is based on the input luminance component, the luminance gain and one or more configurable parameters.

Example 19 includes the method of example 17 or example 18, wherein the calculating of the chromatic gain is based on a ratio of a numerator and a denominator, the numerator based on a first polynomial function of the input luminance component and the luminance gain, the denominator based on a second polynomial function of the input luminance component.

Example 20 includes the method of any one of examples 17 to 19, wherein the numerator and the denominator are further based on one or more configurable parameters.

Example 21 includes the method of any one of examples 17 to 20, wherein the one or more configurable parameters include an exponent parameter to be applied to the first polynomial function and the second polynomial function.

Example 22 includes the method of any one of examples 17 to 21, wherein the one or more configurable parameters include an offset parameter, the first polynomial function includes a first argument based on the input luminance component, the luminance gain and the offset parameter, and the second polynomial function includes a second argument based on the input luminance component and the offset parameter.

Example 23 includes the method of any one of examples 17 to 22, wherein the one or more configurable parameters include a scale parameter, the numerator is based on the first polynomial function multiplied by a first value based on scale parameter, and the denominator is based on the second polynomial function multiplied by a second value based on scale parameter.

Example 24 includes the method of any one of examples 17 to 23, wherein the calculating of the chromatic gain includes subtracting a product of the input luminance component and the luminance gain from an offset parameter increased by one to determine a first value, adding a scale parameter to the luminance gain to determine a second value, multiplying the second value by a result of the first value having been raised to a power corresponding to an exponent parameter to determine a numerator, subtracting the input luminance component from the offset parameter increased by one to determine a third value, increasing the scale parameter by one to determine a fourth value, multiplying the fourth value by a result of the third value having been raised to the power corresponding to the exponent parameter to determine a denominator, and dividing the numerator by the denominator to determine the chromatic gain.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
at least one memory;
machine readable instructions; and
at least one processor circuit to be programmed based on the machine readable instructions to:
convert an input pixel to an input luminance component and input chrominance components, the input pixel included in an input image;
apply a luminance gain to the input luminance component to determine an output luminance component of the input pixel;
subtract a product of the input luminance component and the luminance gain from an offset parameter increased by one to determine a first value;
add a scale parameter to the luminance gain to determine a second value;
multiply the second value by a result of the first value having been raised to a power corresponding to an exponent parameter to determine a numerator;
subtract the input luminance component from the offset parameter increased by one to determine a third value;
increase the scale parameter by one to determine a fourth value;
multiply the fourth value by a result of the third value having been raised to the power corresponding to the exponent parameter to determine a denominator;
divide the numerator by the denominator to determine a chromatic gain;
apply the chromatic gain to the input chrominance components to determine output chrominance components; and
generate an output image including a tone mapped pixel corresponding to the input pixel, the tone mapped pixel based on the output luminance component and the output chrominance components.

2. The apparatus of claim 1, wherein the exponent parameter is configurable.

3. The apparatus of claim 1, wherein the offset parameter is configurable.

4. The apparatus of claim 1, wherein the the scale parameter is configurable.

5. The apparatus of claim 1, wherein the input pixel includes red, green and blue color values, and the input chrominance components include three input chrominance components corresponding respectively to the red, green and blue color values.

6. The apparatus of claim 5, wherein the output chrominance components include three output chrominance components corresponding respectively to the red, green and blue color values.

7. At least one non-transitory computer readable medium comprising computer readable instructions to cause at least one processor circuit to at least:
convert an input pixel to an input luminance component and input chrominance components, the input pixel included in an input image;
apply a luminance gain to the input luminance component to determine an output luminance component of the input pixel;
subtract a product of the input luminance component and the luminance gain from an offset parameter increased by one to determine a first value;
add a scale parameter to the luminance gain to determine a second value;
multiply the second value by a result of the first value having been raised to a power corresponding to an exponent parameter to determine a numerator;
subtract the input luminance component from the offset parameter increased by one to determine a third value;
increase the scale parameter by one to determine a fourth value;
multiply the fourth value by a result of the third value having been raised to the power corresponding to the exponent parameter to determine a denominator;
divide the numerator by the denominator to determine a chromatic gain;
apply the chromatic gain to the input chrominance components to determine output chrominance components; and
generate an output image including a tone mapped pixel corresponding to the input pixel, the tone mapped pixel based on the output luminance component and the output chrominance components.

8. The at least one non-transitory computer readable medium of claim 7, wherein the exponent parameter is configurable.

9. The at least one non-transitory computer readable medium of claim 7, wherein the offset parameter is configurable.

10. The at least one non-transitory computer readable medium of claim 7, wherein the scale parameter is configurable.

11. The at least one non-transitory computer readable medium of claim 7, wherein the input pixel includes red, green and blue color values, and the input chrominance components include three input chrominance components corresponding respectively to the red, green and blue color values.

12. The at least one non-transitory computer readable medium of claim 1, wherein the output chrominance components include three output chrominance components corresponding respectively to the red, green and blue color values.

13. A method to perform tone mapping of an input image, the method comprising:
converting an input pixel to an input luminance component and input chrominance components, the input pixel included in an input image;
applying a luminance gain to the input luminance component to determine an output luminance component of the input pixel;
subtracting a product of the input luminance component and the luminance gain from an offset parameter increased by one to determine a first value;
adding a scale parameter to the luminance gain to determine a second value;
multiplying the second value by a result of the first value having been raised to a power corresponding to an exponent parameter to determine a numerator;
subtracting the input luminance component from the offset parameter increased by one to determine a third value;
increasing the scale parameter by one to determine a fourth value;

multiplying the fourth value by a result of the third value having been raised to the power corresponding to the exponent parameter to determine a denominator;

dividing the numerator by the denominator to determine a chromatic gain;

applying the chromatic gain to the input chrominance components to determine output chrominance components; and generating an output image including a tone mapped pixel corresponding to the input pixel, the tone mapped pixel based on the output luminance component and the output chrominance components.

14. The method of claim 13, wherein the exponent parameter is configurable.

15. The method of claim 13, wherein the offset parameter is configurable.

16. The method of claim 13, wherein the scale parameter is configurable.

17. The method of claim 13, wherein the input pixel includes red, green and blue color values, and the input chrominance components include three input chrominance components corresponding respectively to the red, green and blue color values.

18. The method of claim 17, wherein the output chrominance components include three output chrominance components corresponding respectively to the red, green and blue color values.

* * * * *